(12) United States Patent
Wootton et al.

(10) Patent No.: US 10,686,329 B2
(45) Date of Patent: Jun. 16, 2020

(54) SYSTEMS AND METHODS TO ALLOW FOR A SMART DEVICE

(71) Applicant: IVANI, LLC, Dardenne Prairie, MO (US)

(72) Inventors: Matthew Wootton, St. Louis, MO (US); Boris Dieseldorff, St. Charles, MO (US)

(73) Assignee: Ivani, LLC, Dardenne Prairie, MO (US)

( * ) Notice: Subject to any disclaimer, the term of this patent is extended or adjusted under 35 U.S.C. 154(b) by 0 days.

(21) Appl. No.: 16/373,320

(22) Filed: Apr. 2, 2019

(65) Prior Publication Data

US 2019/0229554 A1 Jul. 25, 2019

Related U.S. Application Data

(63) Continuation of application No. 16/035,141, filed on Jul. 13, 2018, now Pat. No. 10,361,585, which is a (Continued)

(51) Int. Cl.
*H02J 13/00* (2006.01)
*H05B 47/19* (2020.01)
*H01H 9/16* (2006.01)

(52) U.S. Cl.
CPC .......... *H02J 13/0017* (2013.01); *H05B 47/19* (2020.01); *G05B 2219/2642* (2013.01); *H01H 9/168* (2013.01); *H01H 2300/03* (2013.01)

(58) Field of Classification Search
CPC .. H05B 37/0272; H02J 13/0017; H02J 13/00; G05B 2219/2642
See application file for complete search history.

(56) References Cited

U.S. PATENT DOCUMENTS 3,813,579 A 5/1974 Doyle et al.
5,065,104 A 11/1991 Kusko et al.
(Continued)

FOREIGN PATENT DOCUMENTS

CN 1909755 A 2/2007
CN 101184353 A 5/2008
(Continued)

OTHER PUBLICATIONS

International Search Report, International Patent Application No. PCT/US2015/013127, dated Apr. 24, 2015 (10 pages).
(Continued)

*Primary Examiner* — Carlos Amaya
(74) *Attorney, Agent, or Firm* — Lewis Rice LLC

(57) ABSTRACT

Smart switch devices, systems, and methods for modifying an existing electrical system to utilize the power state output of a physical switch as an indicator or signal for the operation of a smart home device or system or network of such devices to facilitate interoperability of physical switches with smart devices. The smart switch detects or determines the power state of a circuit and infers the corresponding state of a mechanical switch that operates the circuit. This information is then transmitted to associated smart devices, which may not be physically connected to the circuit controlled by the switch. When the mechanical switch is operated, it can control both electrically attached loads, such as a conventional light or appliance, and wirelessly control unconnected smart devices.

10 Claims, 6 Drawing Sheets

Related U.S. Application Data continuation-in-part of application No. 15/909,744, filed on Mar. 1, 2018, and a continuation-in-part of application No. 15/449,172, filed on Mar. 3, 2017, now Pat. No. 10,072,942, said application No. 15/909,744 is a continuation-in-part of application No. 15/449,172, filed on Mar. 3, 2017, now Pat. No. 10,072,942, and a continuation-in-part of application No. 14/855,031, filed on Sep. 15, 2015, now Pat. No. 10,211,004, which is a continuation-in-part of application No. 14/698,690, filed on Apr. 28, 2015, now Pat. No. 9,843,194, which is a continuation-in-part of application No. 14/606,881, filed on Jan. 27, 2015, now Pat. No. 9,692,236.

(60) Provisional application No. 62/074,902, filed on Nov. 4, 2014, provisional application No. 62/331,220, filed on May 3, 2016, provisional application No. 61/932,085, filed on Jan. 27, 2014.

(56) References Cited

U.S. PATENT DOCUMENTS

| | | |
|---|---|---|
| 5,563,455 A | 10/1996 | Cheng |
| 6,539,483 B1 | 3/2003 | Harrison et al. |
| 6,693,536 B2 | 2/2004 | Bauer, Jr. et al. |
| 7,423,576 B2 | 9/2008 | Sahinoglu et al. |
| 7,649,727 B2 | 1/2010 | Elberbaum |
| 7,663,325 B2 | 2/2010 | McDonough et al. |
| 7,733,220 B2 | 6/2010 | Libby |
| 8,193,929 B1 | 6/2012 | Siu et al. |
| 8,269,376 B1 | 9/2012 | Elberbaum |
| 8,274,386 B1 | 9/2012 | Dea et al. |
| 8,354,925 B1 | 1/2013 | Libby et al. |
| 8,402,543 B1 | 3/2013 | Ranjan et al. |
| 8,456,304 B2 | 6/2013 | van Doorn et al. |
| 8,502,666 B1 | 8/2013 | Tam et al. |
| 8,531,134 B2 | 9/2013 | Chemel et al. |
| 8,536,998 B1 | 9/2013 | Siu et al. |
| 8,552,664 B2 | 10/2013 | Chemel et al. |
| 8,555,388 B1 | 10/2013 | Wang et al. |
| 8,593,264 B2 | 11/2013 | Umezawa et al. |
| 8,624,734 B2 | 1/2014 | Inomata et al. |
| 8,682,812 B1 | 3/2014 | Ranjan |
| 8,762,298 B1 | 6/2014 | Ranjan et al. |
| 8,766,556 B2 | 7/2014 | Meyer |
| 8,793,790 B2 | 7/2014 | Khurana et al. |
| 8,842,010 B2 | 9/2014 | Cehelnik |
| 8,844,038 B2 | 9/2014 | Niemela |
| 8,849,471 B2 | 9/2014 | Daniel et al. |
| 8,984,581 B2 | 3/2015 | Luna et al. |
| 9,144,041 B2 | 9/2015 | Curtis et al. |
| 9,185,121 B2 | 11/2015 | Chari et al. |
| 9,245,426 B2 | 1/2016 | Fernandez et al. |
| 9,369,476 B2 | 6/2016 | Chekina et al. |
| 9,378,361 B1 | 6/2016 | Yen et al. |
| 9,407,663 B1 | 8/2016 | Pauley, Jr. et al. |
| 9,413,839 B2 | 8/2016 | Annan et al. |
| 9,575,091 B2 | 2/2017 | Reeder, III |
| 9,955,555 B2 | 4/2018 | Lark, Jr. |
| 2003/0090917 A1 | 5/2003 | Chan et al. |
| 2004/0080415 A1 | 4/2004 | Sorensen |
| 2004/0196140 A1 | 10/2004 | Sid |
| 2006/0037077 A1 | 2/2006 | Gadde et al. |
| 2006/0089117 A1 | 4/2006 | Suzuki |
| 2006/0161270 A1 | 7/2006 | Luskin et al. |
| 2007/0007826 A1 | 1/2007 | Mosebrook et al. |
| 2007/0225000 A1 | 9/2007 | Cleveland |
| 2007/0283002 A1 | 12/2007 | Bomhoevd et al. |
| 2008/0024074 A1 | 1/2008 | Mosebrook et al. |
| 2008/0062940 A1 | 3/2008 | Othmer et al. |
| 2008/0148398 A1 | 6/2008 | Mezack et al. |
| 2008/0318564 A1 | 12/2008 | Kreiner et al. |
| 2009/0079416 A1 | 3/2009 | Vinden et al. |
| 2009/0121842 A1 | 5/2009 | Elberbaum |
| 2009/0174569 A1 | 7/2009 | Smith et al. |
| 2009/0184804 A1 | 7/2009 | Seppa |
| 2009/0241283 A1 | 10/2009 | Loveless et al. |
| 2009/0256483 A1 | 10/2009 | Gehman et al. |
| 2009/0267632 A1 | 10/2009 | Rowe et al. |
| 2009/0284245 A1 | 11/2009 | Kirby et al. |
| 2010/0070217 A1 | 3/2010 | Shimada et al. |
| 2010/0125897 A1 | 5/2010 | Jain et al. |
| 2010/0145545 A1 | 6/2010 | Mosebrook et al. |
| 2010/0278537 A1 | 11/2010 | Elberbaum |
| 2010/0301775 A1 | 12/2010 | Bella |
| 2011/0082599 A1 | 4/2011 | Shinde et al. |
| 2011/0109301 A1 | 5/2011 | Johnson et al. |
| 2011/0141647 A1 | 6/2011 | Garcia et al. |
| 2011/0153811 A1 | 6/2011 | Jeong et al. |
| 2011/0175553 A1 | 7/2011 | Sampsell |
| 2011/0182012 A1 | 7/2011 | Hilton et al. |
| 2011/0211563 A1 | 9/2011 | Herrala et al. |
| 2011/0304205 A1 | 12/2011 | Lee |
| 2011/0309931 A1 | 12/2011 | Rose |
| 2012/0046003 A1 | 2/2012 | Ying |
| 2012/0049639 A1 | 3/2012 | Besore et al. |
| 2012/0092060 A1 | 4/2012 | Ganesan |
| 2012/0146788 A1 | 6/2012 | Wilson et al. |
| 2012/0181865 A1 | 7/2012 | Muthu |
| 2012/0207481 A1 | 8/2012 | Elberbaum |
| 2012/0207484 A1 | 8/2012 | Hunt |
| 2012/0262006 A1 | 10/2012 | Elberbaum |
| 2012/0280822 A1 | 11/2012 | Kuo |
| 2013/0102264 A1 | 4/2013 | Nakane et al. |
| 2013/0162459 A1 | 6/2013 | Aharony et al. |
| 2013/0175863 A1 | 7/2013 | Pan |
| 2013/0201316 A1 | 8/2013 | Binder et al. |
| 2013/0260602 A1 | 10/2013 | German et al. |
| 2013/0320769 A1 | 12/2013 | Sawyers |
| 2014/0004874 A1 | 1/2014 | Schwartz et al. |
| 2014/0005809 A1 | 1/2014 | Frei et al. |
| 2014/0097758 A1 | 4/2014 | Recker et al. |
| 2014/0105079 A1 | 4/2014 | Bengtsson et al. |
| 2014/0117780 A1 | 5/2014 | Buchheim et al. |
| 2014/0117871 A1 | 5/2014 | Swatsky et al. |
| 2014/0165207 A1 | 6/2014 | Engel et al. |
| 2014/0169795 A1 | 6/2014 | Clough |
| 2014/0211345 A1 | 7/2014 | Thompson et al. |
| 2014/0214218 A1 | 7/2014 | Eldridge et al. |
| 2014/0265881 A1* | 9/2014 | Karc .............. H05B 37/0272 315/158 |
| 2014/0266171 A1 | 9/2014 | Mosser et al. |
| 2014/0330960 A1 | 11/2014 | Haga et al. |
| 2015/0005900 A1* | 1/2015 | Steele ................ G05B 15/02 700/19 |
| 2015/0022123 A1 | 1/2015 | Van De Sluis et al. |
| 2015/0022181 A1 | 1/2015 | Anderson et al. |
| 2015/0059086 A1 | 3/2015 | Clough |
| 2015/0059248 A1 | 3/2015 | Iwata et al. |
| 2015/0069242 A1 | 3/2015 | Alameh et al. |
| 2015/0088331 A1 | 3/2015 | Fiedler et al. |
| 2015/0143454 A1 | 5/2015 | Lee et al. |
| 2015/0295808 A1 | 10/2015 | O'Malley et al. |
| 2015/0301173 A1 | 10/2015 | Vangeel et al. |
| 2016/0021485 A1 | 1/2016 | Sallas et al. |
| 2016/0028763 A1 | 1/2016 | Cruz Mota et al. |
| 2016/0050182 A1 | 2/2016 | Edross |
| 2016/0050224 A1 | 2/2016 | Ricafort et al. |
| 2016/0126031 A1 | 5/2016 | Wootton et al. |
| 2016/0234167 A1 | 8/2016 | Engel et al. |
| 2018/0070431 A1 | 3/2018 | Charlton et al. |

FOREIGN PATENT DOCUMENTS

| | | |
|---|---|---|
| CN | 201319687 Y | 9/2009 |
| CN | 201467534 U | 5/2010 |
| CN | 201639825 U | 11/2010 |
| CN | 201839492 U | 5/2011 |
| CN | 102131327 A | 7/2011 |
| CN | 202475882 U | 10/2012 |
| CN | 202738203 U | 2/2013 |
| CN | 202759621 U | 2/2013 |

(56) References Cited

FOREIGN PATENT DOCUMENTS

| | | | |
|---|---|---|---|
| CN | 203241317 U | 10/2013 | |
| CN | 203243557 U | 10/2013 | |
| CN | 203251317 U | 10/2013 | |
| EP | 1829003 B1 | 11/2013 | |
| JP | 2005136532 A | 5/2005 | |
| JP | 2006129098 A | 5/2006 | |
| JP | 2007159370 A | 6/2007 | |
| JP | 2008042998 A | 2/2008 | |
| JP | 2008305800 A | 12/2008 | |
| JP | 2011109784 A | 6/2011 | |
| JP | 201552475 A | 3/2015 | |
| KR | 100887425 B1 | 3/2009 | |
| KR | 100912039 B1 | 8/2009 | |
| KR | 20090113941 A | 11/2009 | |
| KR | 101009613 B1 | 1/2011 | |
| KR | 20130012996 A | 2/2013 | |
| KR | 20130017298 A | 2/2013 | |
| KR | 20140080755 A | 7/2014 | |
| KR | 20140120748 A | 10/2014 | |
| WO | 2008035322 A1 | 3/2008 | |
| WO | 2011055199 A1 | 5/2011 | |
| WO | 2011062445 A2 | 5/2011 | |
| WO | 2012010170 A1 | 1/2012 | |
| WO | 2014026226 A1 | 2/2014 | |
| WO | 2014109486 A1 | 7/2014 | |
| WO | 2015035830 A1 | 3/2015 | |

OTHER PUBLICATIONS

International Search Report, International Patent Application No. PCT/US2015/058019, dated Feb. 5, 2016 (10 pages).
International Search Report, International Patent Application No. PCT/US2015/057869, dated Feb. 5, 2016, 10 pages.
International Search Report, International Patent Application No. PCT/US2017/030864, dated Jul. 28, 2017 (13 pages).
Supplementary European Search Report, European Application No. EP 15 74 0354.4, dated on Sep. 20, 2017 (8 pages).
Supplementary European Search Report, European Application No. EP 15 85 7587.8, dated on Sep. 20, 2017 (12 pages).
Using Encryption: Bluetooth Technology, http://www.brighthub.com/computing/smb-security/articles/106638.aspx, Feb. 15, 2011 (5 pages).
International Search Report, International Patent Application No. PCT/US2016/016836, dated May 24, 2016 (12 pages).
International Search Report, International Patent Application No. PCT/US2016/045611, dated May 16, 2017 (10 pages).
Extended European Search Report, International Patent Application No. EP15857698, dated Jun. 5, 2018 (12 pages).
ADIB, Fadel et al., "See Through Walls with Wi-Fi!" ACM SIGCOMM Computer Communication Review, 2013.10, vol. 43, Issue 4, pp. 75-86 (12 pages).

* cited by examiner

SYSTEMS AND METHODS TO ALLOW FOR A SMART DEVICE

CROSS-REFERENCE TO RELATED APPLICATIONS

This application is a Continuation of U.S. Utility application Ser. No. 16/035,141, filed Jul. 13, 2018, which is a Continuation-in-Part of U.S. Utility patent application Ser. No. 15/909,744, filed Mar. 1, 2018, and is a Continuation-in-Part of U.S. Utility patent application Ser. No. 15/449,172 filed Mar. 3, 2017. U.S. Utility patent application Ser. No. 15/909,744 is a Continuation-in-Part of U.S. Utility patent application Ser. No. 15/449,172, and is a Continuation-in-Part of U.S. Utility patent application Ser. No. 14/855,031 filed Sep. 15, 2015. U.S. Utility patent application Ser. No. 14/855,031 is a Continuation-in-Part of U.S. Utility patent application Ser. No. 14/698,690 and claims benefit of U.S. Provisional Pat. App. No. 62/074,902. U.S. Utility patent application Ser. No. 15/449,172 claims benefit of U.S. Provisional Pat. App. No. 62/331,220. U.S. Utility patent application Ser. No. 14/698,690 is a Continuation-in-Part of U.S. Utility patent application Ser. No. 14/606,881 filed on Jan. 27, 2015 and claims benefit of U.S. Provisional Pat. App. No. 62/074,902. U.S. Utility patent application Ser. No. 14/606,881 claims benefit of U.S. Provisional Pat. App. No. 61/932,085. The entire disclosure of all of the foregoing documents are incorporated herein by reference.

BACKGROUND

1. Field of the Invention

This disclosure is related to the field of electrical wiring, and more particularly to systems, methods, and apparatus pertaining to an intelligent multi-way electric switch.

The era of home automation, sometimes also known as "domotics," has arrived and homeowners and property managers are increasingly turning to "smart home" devices. Despite the name, smart home technologies have applications that range beyond dwellings, as they facilitate the automation and control of common home operating systems such as electrical, lighting, heating, ventilation, air conditioning (HVAC), security, as well as integration with smart appliances, such as washers/dryers, ovens, dishwashers, refrigerators and freezers.

Generally, these technologies use the now almost-ubiquitous wireless local access network (WLAN) found in most homes in combination with the also widespread availability of wireless network-enabled mobile computers, such as tablet PCs and smart phones, to connect to and manage "smart devices." Obviously, participating smart home devices likewise comprise wireless transmitters for receiving instructions and transmitting status and other data, and computers for intelligent, programmatic management of the devices.

One common problem with implementing home automation, however, is that very few dwellings are constructed with home automation in mind. Even for new construction, homes are typically built in accordance with decades-old construction practices and using long-accepted conventional materials and components. Converting homes to use smart home devices is simple for certain types of home operating systems, but difficult for others.

For example, HVAC and security systems are typically operated via a main control, such as a thermostat or security panel. These main controls can simply be replaced with network-enabled smart device counterparts to enable home automation. This is easy to do even for an unskilled homeowner, as these remote panels usually operate on low-voltage circuits that pose little material risk to even the untrained homeowner, and have simpler configurations that can be easily transferred from an existing "dumb" device to a new smart device.

However, other home systems are more complicated. For example, electrical power enters a home usually through overhead or buried power lines. The home is connected to the power grid via a circuit breaker panel, which is usually located in a garage, basement, or electrical closet near the physical point where the power lines reach the dwelling. The circuit breaker then splits the incoming power into a plurality of different independent circuits, each of which is separately controllable at the panel by throwing a circuit breaker on or off.

Although certain high-load appliances may have dedicated circuits, typically an entire room or set of rooms with related functions are wired in parallel on a shared circuit. For example, an electric oven might receive its own circuit, but all lights and power outlets in a bedroom might all be wired together. This limits the degree of granularity by which circuits might be operable via the breaker. Moreover, unlike a low-voltage thermostat, most homeowners lack the knowledge, expertise, or equipment to safely alter a circuit breaker. Thus, implementing smart home technology in light and power fixtures is not practical at the breaker.

Instead, smart home technologies have focused on replacing individual power and light receptacles, a task which can be performed safely by a careful homeowner even if unskilled. However, this approach has certain inherent limitations and drawbacks, in that power may not always be available in certain applications, and such replacements generally do not integrate smoothly with conventional hardware.

This may be best understood through an example. Prior art FIGS. 1A, 1B, and 1C depict a simple conventional light switch wiring geometry. As seen in FIGS. 1A and 1B, a live power line (103) runs from the circuit breaker (or other equivalent power source) to a conventional switch (107) (here shown as a single-pole, single-throw, or SPST switch), and from there to a load (108), shown here at a light receptacle. A neutral line (105) runs from the load (108) back to the power source, thereby completing the circuit. FIG. 1A depicts both a schematic and electric diagram of such a circuit in which the switch (107) is in off position. In this position, the circuit is broken by the switch, no current flows through the wires, and the load (108) is unpowered. FIG. 1B shows the same circuit with the switch in "on" position, completing the circuit, allowing current to flow to the load, which is shown powered.

In a conventional smart home installation, the light receptacle (108) is simply replaced by a smart light (109), such as that depicted in FIG. 1C. As shown, a smart light (109) receptacle generally includes a computer (111) and a wireless transmitter (113), as well as the load (108) itself (in this case a light receptacle). The smart device (109) then contains its own independent switch (115) for operating the light, which is operated by the computer (111) in response to commands or instructions received wirelessly at the transceiver (113) from a user device or other external source.

However, this configuration has a key shortcoming. While a holistic home automation strategy may involve replacing all components in a structure, it is more common to target key areas and rooms and upgrade over time. This means that most home automation deployments have a mixture of "dumb" and "smart" lights, outlets, switches, and other components. However, smart lights do not seamlessly integrate with mechanical switches.

This is because the computer (111) and transmitter (113) require power to operate, but if the original wall switch (107) is turned off, no current flows on the live wire (103) and there is thus no power to the computer (111) and transmitter (113), and they cannot operate. This can be partially solved by simply leaving the switch (107) in "on" position and exclusively using another device to power the switch. However, when guests, children, or even forgetful homeowners leave the room, they may reflexively turn off the light switch without recalling or appreciating that this effectively disables the smart light (109). Frustrating the situation further, the removal of power for a long enough period of time can cause smart devices to reset to factory settings or lose configuration data, requiring that they be reconfigured and retested once power is restored.

This could be solved by simply disabling the physical switch entirely so that it cannot be used to control power flow. This leaves a non-functional blank faceplate on the wall, which may be confusing to guests and visitors who do not understand how to use the smart light system, and it requires all such switches to be replaced or disabled. Moreover, it is desirable to retain the functionality of the physical switch in conjunction with the smart device so that the smart device can be operated both via the home automation system and via a conventional physical switch.

SUMMARY

The following is a summary of the invention in order to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

Because of these and other problems in the art, described herein, among other things, is a smart switch comprising: an electric power input adapted to receive electric power from an electric circuit; a measurement device in electric communication with the electric power input and adapted to measure at least one circuit characteristic of the electric circuit; and a transceiver in electric communication with the measurement device and adapted to receive from the measurement device a measure of power on the electric circuit; wherein the transmitter receives from the measurement device a reading of the power state of the electric circuit detected by the measurement device and transmits information about the reading.

In an embodiment, the circuit characteristic is selected from the group consisting of: power applied; current; voltage; and, phase.

In an embodiment, the transmitted information indicates whether power is available on the electric circuit.

In an embodiment, the reading is made at least in part using the circuit characteristics.

In an embodiment, the circuit characteristic is indicative of the power state based on a known mathematical relationship between the circuit characteristic and the power state.

In an embodiment, the smart switch is adapted to electrically connect to the electric circuit using a power receptacle.

In an embodiment, the smart switch further comprises a light-producing element.

In an embodiment, the load is selected from the group consisting of: light element, dimmer control circuit, ceiling fan, and wireless range extender.

In an embodiment, the smart switch further comprises a power converter adapted to draw power for the smart switch from the electric circuit.

In an embodiment, the smart switch further comprises an energy storage medium adapted to supply electric power to the transceiver.

In an embodiment, the energy storage medium is selected from the group consisting of: capacitor; inductor; battery; and, rechargeable battery.

In an embodiment, the smart switch further comprises at least one capacitor, battery, or rechargeable battery.

Also described herein, among other things, is a method for determining the state of electrical power comprising: providing an electric circuit operable among a plurality of power states by a control; providing a smart switch on the electric circuit; providing a computer server; operating the control to change the power state of the electric circuit; detecting, using the smart switch, the changed power state; and transmitting, using the smart switch, the changed power state to the computer server.

In an embodiment, the control comprises a mechanical switch.

In an embodiment, the changed power state is from powered to unpowered.

In an embodiment, the detecting further comprises the smart switch determining at least one characteristic of power to the smart switch.

In an embodiment, the at least one characteristic is selected from the group consisting of: power applied; current; voltage; and, phase.

In an embodiment, the method further comprises determining a state of the control based at least in part on the determined at least one characteristic.

In an embodiment, the transmitted changed power state includes a final power state of the electric circuit after the change in the power state.

In an embodiment, the transmitted changed power state includes an initial power state of the electric circuit before the change in the power state.

In an embodiment, the transmitted changed power state includes an amount of change between an initial power state of the circuit before the change in power state and a final power state of the circuit after the change in power state.

In an embodiment, the method further comprises controlling, using the computer server, a lighting system.

In an embodiment, smart switch further comprises a light-producing element.

In an embodiment, the method further comprises: providing one or more external devices in wireless communication with the computer server; receiving, at the computer server, the changed power state information; and transmitting, at the computer server, instructions to the one or more external devices, the instructions being determined at least in part based on the received changed power state.

In an embodiment, the transmitted instructions to the one or more external devices are further determined at least in part based on one or more of: day of the week; date; time; light sensors; user settings; knowledge of prior system state; and, states of other inputs.

DESCRIPTION OF THE PREFERRED EMBODIMENT(S)

Figure 1A:
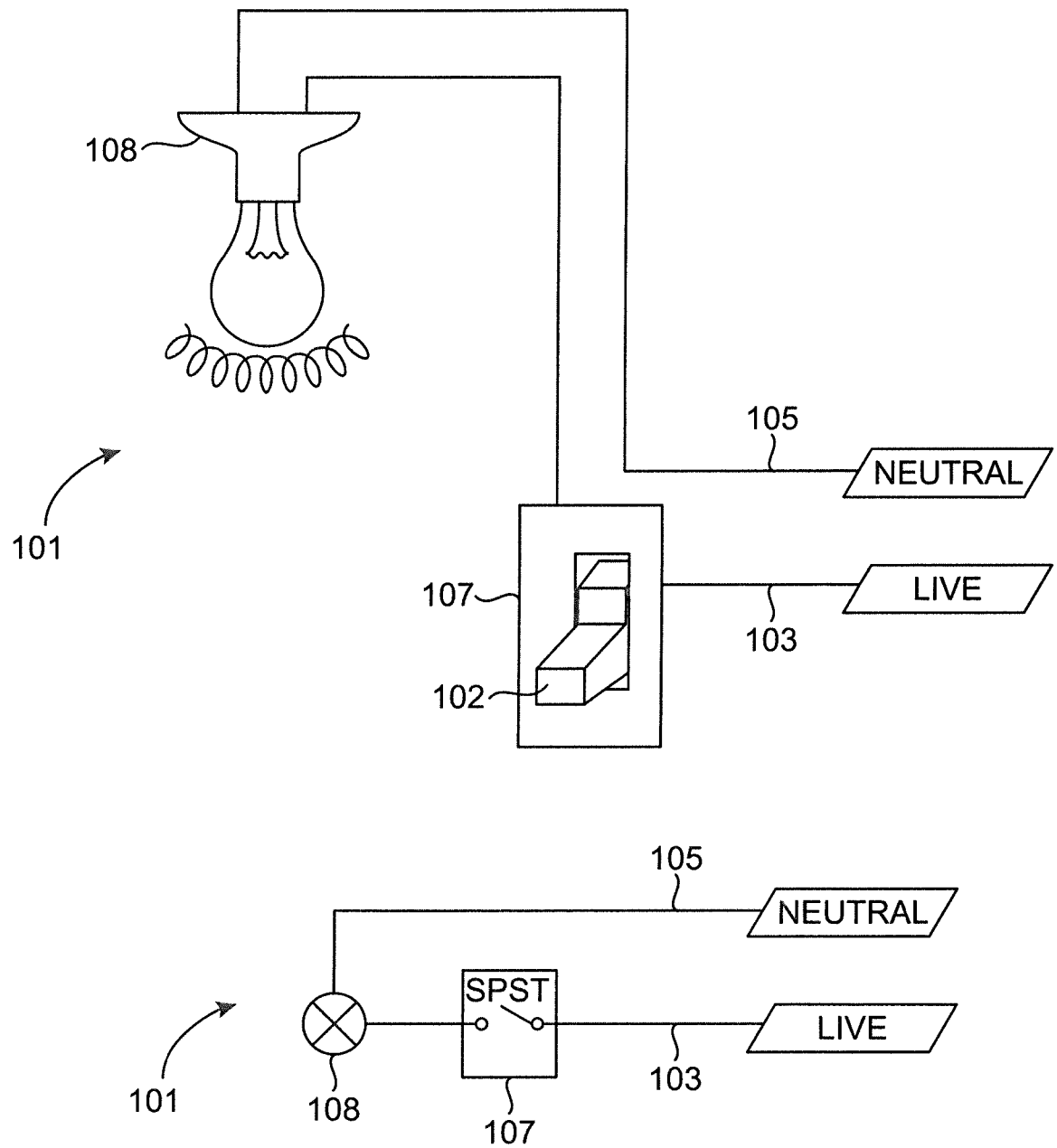
FIGS. 1A, 1B, and 1C depict a prior art conversion of a conventional light to a smart light.
Figure 1B:
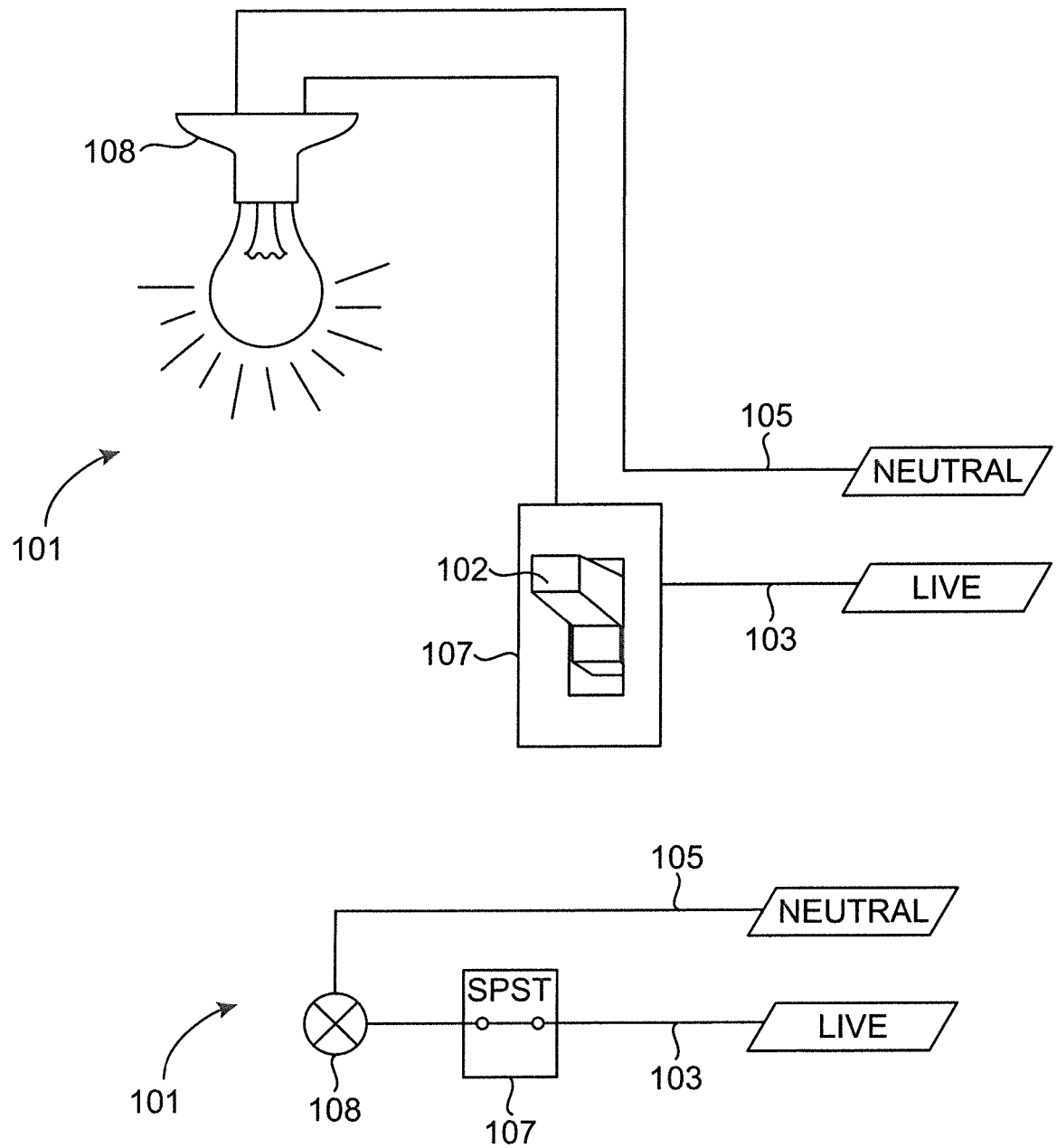
Figure 1C:
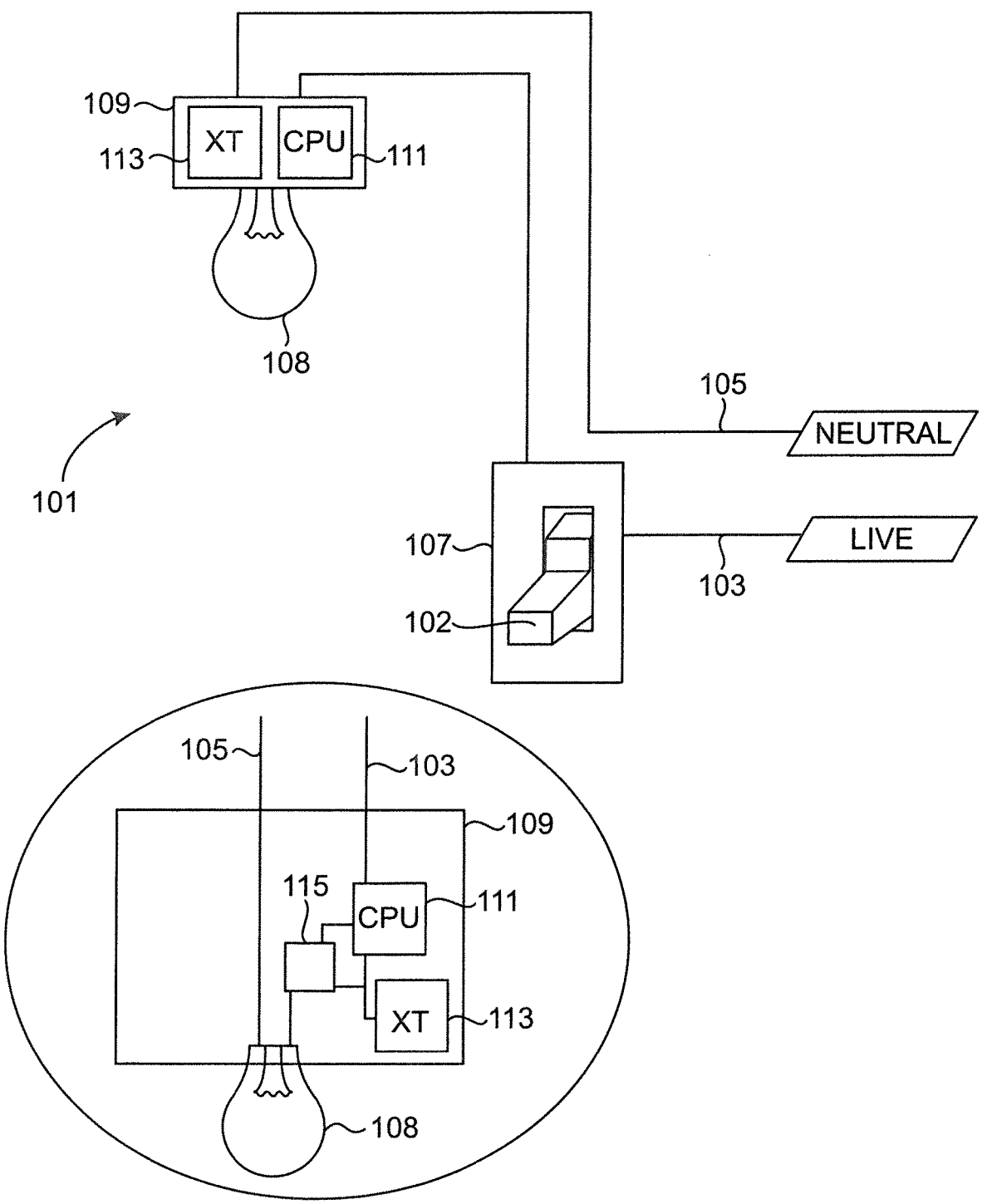

The following detailed description and disclosure illustrates by way of example and not by way of limitation. This description will clearly enable one skilled in the art to make and use the disclosed systems and methods, and describes several embodiments, adaptations, variations, alternatives and uses of the disclosed systems and methods. As various changes could be made in the above constructions without departing from the scope of the disclosures, it is intended that all matter contained in the description or shown in the accompanying drawings shall be interpreted as illustrative and not in a limiting sense.

Throughout this disclosure, the term "computer" describes hardware which generally implements functionality provided by digital computing technology, particularly computing functionality associated with microprocessors. The term "computer" is not intended to be limited to any specific type of computing device, but it is intended to be inclusive of all computational devices including, but not limited to: processing devices, microprocessors, personal computers, desktop computers, laptop computers, workstations, terminals, servers, clients, portable computers, handheld computers, smart phones, tablet computers, mobile devices, server farms, hardware appliances, minicomputers, mainframe computers, video game consoles, handheld video game products, and wearable computing devices including but not limited to eyewear, wristwear, pendants, and clip-on devices.

As used herein, a "computer" is necessarily an abstraction of the functionality provided by a single computer device outfitted with the hardware and accessories typical of computers in a particular role. By way of example and not limitation, the term "computer" in reference to a laptop computer would be understood by one of ordinary skill in the art to include the functionality provided by pointer-based input devices, such as a mouse or track pad, whereas the term "computer" used in reference to an enterprise-class server would be understood by one of ordinary skill in the art to include the functionality provided by redundant systems, such as RAID drives and dual power supplies.

It is also well known to those of ordinary skill in the art that the functionality of a single computer may be distributed across a number of individual machines. This distribution may be functional, as where specific machines perform specific tasks; or, balanced, as where each machine is capable of performing most or all functions of any other machine and is assigned tasks based on its available resources at a point in time. Thus, the term "computer" as used herein, can refer to a single, standalone, self-contained device or to a plurality of machines working together or independently, including without limitation: a network server farm, "cloud" computing system, software-as-a-service, or other distributed or collaborative computer networks.

Those of ordinary skill in the art also appreciate that some devices which are not conventionally thought of as "computers" nevertheless exhibit the characteristics of a "computer" in certain contexts. Where such a device is performing the functions of a "computer" as described herein, the term "computer" includes such devices to that extent. Devices of this type include but are not limited to: network hardware, print servers, file servers, NAS and SAN, load balancers, and any other hardware capable of interacting with the systems and methods described herein in the matter of a conventional "computer."

Throughout this disclosure, the term "software" refers to code objects, program logic, command structures, data structures and definitions, source code, executable and/or binary files, machine code, object code, compiled libraries, implementations, algorithms, libraries, or any instruction or set of instructions capable of being executed by a computer processor, or capable of being converted into a form capable of being executed by a computer processor, including without limitation virtual processors, or by the use of run-time environments, virtual machines, and/or interpreters. Those of ordinary skill in the art recognize that software can be wired or embedded into hardware, including without limitation onto a microchip, and still be considered "software" within the meaning of this disclosure. For purposes of this disclosure, software includes without limitation: instructions stored or storable in RAM, ROM, flash memory BIOS, CMOS, mother and daughter board circuitry, hardware controllers, USB controllers or hosts, peripheral devices and controllers, video cards, audio controllers, network cards, Bluetooth® and other wireless communication devices, virtual memory, storage devices and associated controllers, firmware, and device drivers. The systems and methods described herein are contemplated to use computers and computer software typically stored in a computer- or machine-readable storage medium or memory.

Throughout this disclosure, terms used herein to describe or reference media holding software, including without limitation terms such as "media," "storage media," and "memory," may include or exclude transitory media such as signals and carrier waves.

Throughout this disclosure, the term "network" generally refers to a voice, data, or other telecommunications network over which computers communicate with each other. The term "server" generally refers to a computer providing a service over a network, and a "client" generally refers to a computer accessing or using a service provided by a server over a network. Those having ordinary skill in the art will appreciate that the terms "server" and "client" may refer to hardware, software, and/or a combination of hardware and software, depending on context. Those having ordinary skill in the art will further appreciate that the terms "server" and "client" may refer to endpoints of a network communication or network connection, including but not necessarily limited to a network socket connection. Those having ordinary skill in the art will further appreciate that a "server" may comprise a plurality of software and/or hardware servers delivering a service or set of services. Those having ordinary skill in the art will further appreciate that the term "host" may, in noun form, refer to an endpoint of a network communication or network (e.g., "a remote host"), or may, in verb form, refer to a server providing a service over a network ("hosts a website"), or an access point for a service over a network.

Throughout this disclosure, the term "embedded system," "embedded computer," and variants thereof distinguish special purpose computer hardware and software from general-purpose computer hardware and software. As used herein, an embedded system is a special-purpose system in which the computer is mostly or completely encapsulated by the device it controls. Unlike a general-purpose computer, such as a personal computer, an embedded system generally performs more limited, pre-defined tasks, usually with very specific requirements to accomplish a limited and pre-defined set of operational tasks. Since the system is dedicated to a specific task, it is more easily optimized for the task, reducing size and cost by eliminating unnecessary components found in general-purpose computers, and designing board circuitry and system geometry to improve operational efficiency, reduce manufacturing cost, and address operation-specific conditions, such as temperature extremes.

Throughout this disclosure, the term "mechanical switch" or "physical switch" refers to an electrical switch structure operable to an "on" or "off" position, in which the "on" position "makes" a circuit by providing a complete electrical path through the device, and the "off" position "breaks" the circuit by interrupting or diverting current flow. This is typically done by introducing a physical break in the path of sufficient width to form an insulating air gap. The term "contacts" refers to the physical components of the switch which create or remove this gap, such as the poles and throws in a conventional light switch. By contrast, the term "toggle" refers to a component of the switch that is (usually) electrically insulated from the current flow and physically manipulated to make or break the circuit. In a conventional dwelling, the toggle is the part colloquially referred to as the "light switch" and move up or down to turn lights on or off, but should be understood in the context of this disclosure as meaning any human-operable means for a user to place the contacts in the desired on/off state.

Throughout this disclosure, a "toggle event" means the changing of the position of a toggle from a first position to a second position. A person of ordinary skill in the art will appreciate that while toggles typically have only two functional positions, it is known in the art to have a multi-position toggle settable to three or more positions. A person of ordinary skill in the art will also appreciate that a continuous dimmer would appear to the system as a continuously variable set of toggle positions. Description is provided herein using the illustrative embodiment of a binary toggle, but a person of ordinary skill in the art will understand that the teachings of this disclosure may be easily adapted to implement the invention in a three-position toggle or more.

Figure 2:
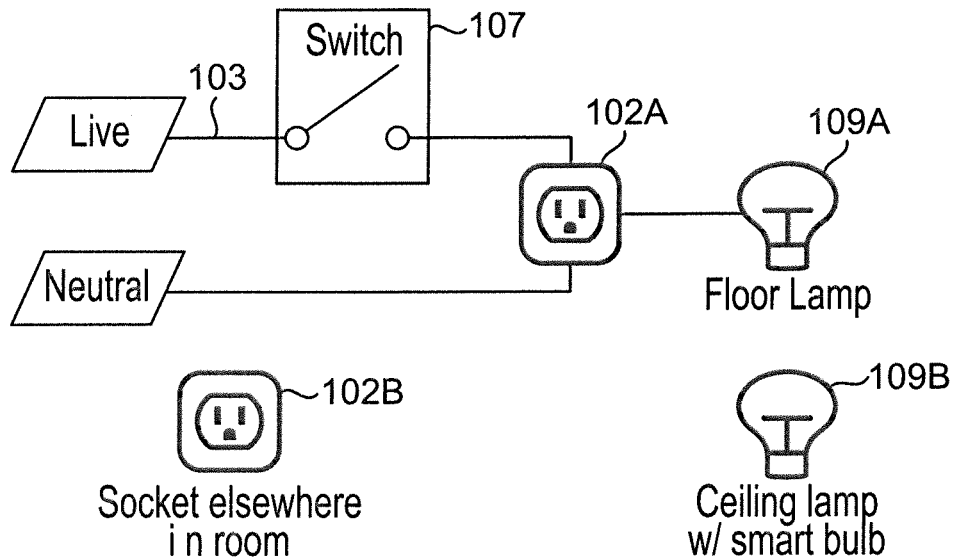
FIG. 2 depicts a prior art use of a smart light in a conventional circuit.

Described herein are devices, systems, and methods for modifying an existing electrical system to utilize the power state output of a physical switch as an indicator or signal for the operation of a smart home device or system or network of such devices. At the core of the problem solved by the present disclosure is the non-interoperability of physical switches with smart devices. As described in the background section, and shown in prior art FIG. 2, physical switches simply provide, or break, the flow of power to the loads connected to a circuit. Thus, the operation of connected loads is dependent upon the presence or absence of electron flow on the wire. By contrast, smart devices are characterized by receiving instructions about which state they should adopt, and containing software configured to set the devices state in accordance therewith, based upon external input provided to the smart device. It should be clear to a person of ordinary skill in the art that a smart device relies upon a continual supply of power in order to operate the software and related circuitry needed to carry out this function. When such smart devices are mixed in a conventional electrical circuit using physical switches, however, power may be lost, frustrating the purpose of the smart device.

To solve this problem, the apparatus and methods described herein include a "smart switch" device. Generally speaking, the smart switch detects or determines the power state of a circuit and infers the corresponding state of a mechanical switch that operates the circuit. This information is then transmitted to associated smart devices, allowing a smart device that is not physically connected to the circuit controlled by the switch to nevertheless effectively operate as thought it was. Thus, when the mechanical switch is operated, it can control both an electrically attached load (e.g., a conventional light) and wirelessly operate electrically unconnected smart devices. Both an apparatus having a structure for these functions and methods, and the functions and methods themselves, are described herein.

Figure 3:
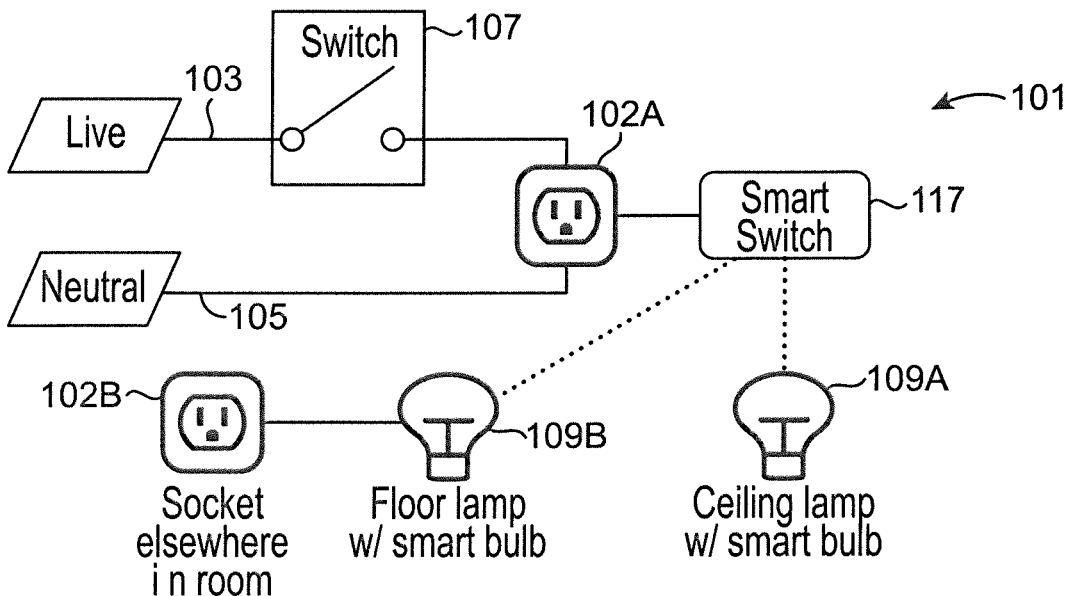
FIG. 3 depicts a schematic diagram of an embodiment of a circuit using a smart switch.

Generally at a high level, described herein is a smart switch apparatus (117) attachable to, or integrated with, a conventional power circuit. An embodiment of such an apparatus (117) is depicted in FIG. 3, which shows a schematic diagram of a system (101) using an embodiment of a smart switch apparatus (117). In the depicted system (101) of FIG. 3, a conventional electrical circuit comprises a live power line (103) from a power source to a conventional switch (107) and then to a power receptacle (102A). A neutral line (105) then runs from the receptacle (102A) back to the power source to complete the circuit. As will be readily understood by a person of ordinary skill in the art, the power receptacle (102A) receives power when the switch (107) is closed, and does not have power when the switch (107) is open. Thus, whatever load is connected to the circuit via the power receptacle (102A), that load will be powered when the switch (107) is closed, and unpowered when the switch (107) is open. As can be further seen in FIG. 3, a smart switch apparatus (117) according to the present disclosure is attachable to the circuit by plugging the apparatus (117) into the power receptacle (102A). Thus, when the switch (107) is closed, power flows through the power receptacle (102A), and through the circuitry of the apparatus (117), thereby providing power to it (117). When the switch (107) is open, power is removed, and does not flow to the apparatus (117).

The smart switch apparatus (117) contains circuitry, components and/or software configured to detect that the circuit is on and that the circuit state is powered. This is done by measuring or detecting current flowing into the device (117). Based on this information, the apparatus (117) may then utilize a transceiver to broadcast or transmit a wireless signal to other smart devices, such as the depicted ceiling lamp (109A), and floor lamp (109B). As can be seen in FIG. 3, this allows the apparatus (117) to control the ceiling lamp (109A), and the floor lamp (109B), whether or not either device is on the same physical circuit as the apparatus (117) or the receptacle (102A).

For example, as will be clear to a person of ordinary skill in the art, the ceiling lamp (109A) depicted in FIG. 3 is generally a ceiling mounted structure that is wired to a wall switch, which may be the same or a different switch as the switch (107) of the depicted circuit. Similarly, the second depicted power outlet (102B) may be operated by a different switch, or may not be operated by a switch at all, but rather may be under continuously available power. Regardless, the apparatus (117) is plugged into the receptacle (102A) controlled by the depicted switch (107). This has the effect of allowing the operation of the depicted switch (107) to operate the depicted ceiling lamp (109A) and floor lamp (109B), regardless of the wiring geometry and relationships of each device. Thus, when the depicted switch (107) is closed, and power is provided to the apparatus (117), the apparatus will also provide a signal to the smart devices (109A) and (109B) that they should switch to a powered on mode. That is, when the smart switch (117) detects power (i.e., determines that the circuit is on), the smart switch (117) may infer a user's intent to turn on all lights, and then use a transceiver to instruct a smart light (109A) and (109B) to turn on.

As will also be clear, this configuration allows the floor lamp (109B) equipped with a smart bulb (109B) to be moved elsewhere in the room, to any available socket, without affecting the operation of the lamp (109B) via the depicted switch (107). The techniques and methods for pairing the apparatus (117) with the depicted smart devices (109A) and (109B) are by now familiar and well known to a person of ordinary skill in the art and need not be explained here.

FIG. 3 depicts the smart devices (109A) and (109B) as a ceiling lamp (109A) and a floor lamp (109B), respectively, but it will be clear to a person of ordinary skill in the art that these are illustrative examples only and should not be understood or construed as limiting the scope or extent of the present disclosure. Other smart devices may equally be used in conjunction with the depicted apparatus (117), and to the same effect. For example, the smart device may be a smart thermostat or security camera, which can receive a signal to alter the temperature or begin monitoring based on the state of the depicted switch (107).

The apparatus (117) may be enclosed in a housing and adapted to be plugged into a power receptacle (102A), or may be a power receptacle itself which integrates the features and functions described herein, while also providing a power outlet into which other electrical devices may be plugged.

Figure 6:
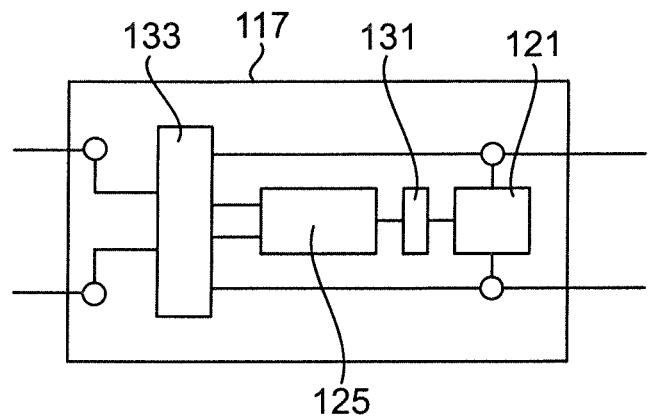
FIG. 6 depicts an embodiment of a smart switch.

FIG. 6 depicts a logical diagram of an electric system using a smart switch apparatus (117) according to the present disclosure. In the depicted embodiment of FIG. 6, the apparatus (117) comprises two primary components, and other optional components. The two primary components are a device or means for detecting the flow of current (121), such as a current sensor, and a transceiver (125). Additionally, the apparatus (117) may optionally comprise a battery (131) or other secondary power source (131). These elements may be wired together in a circuitry configured such that when power is detected by the detection means (121), a broadcast signal is transmitted by the transceiver (125) indicating the presence of power. Similarly, when power is no longer detected by the detection means (121), the circuitry may be configured such that this causes the transceiver (125) to broadcast an indication that power is no longer being received. The secondary power source (131) may be used to power the transceiver (125), and other elements of the apparatus (117), on a short-term basis as needed to complete the transmission. This may be necessary because when power is removed, if the device is configured to rely upon that source of power (e.g., the live power line (103)) then the removal of power will cause the circuits and components of the apparatus (117) to no longer function. By the time the absence of a power supply is detected by the detection means (121), it is very likely that the transceiver (125) lacks power to perform a transmission. By providing a secondary power source (131), the secondary power source (131) can power the components of the apparatus (117) long enough to complete the transmission. In an embodiment, the secondary power source may continue to power the apparatus (117) for a longer period of time than is reasonably necessary to complete the transmission.

As will be readily appreciated by a person of ordinary skill in the art, the particular circuit geometry and configuration of the apparatus (117) will vary from embodiment to embodiment depending upon factors such as the size and shape of the housing, components, and intended use case. By way of example, and not limitation, the program logic may be hard coded into a controller contained within the apparatus (117). Alternatively, the apparatus (117) may include a microprocessor, along with program instructions stored on a computer-readable memory disposed within the apparatus (117). These and other techniques for implementing the functionality described herein are known, and need not be further explained.

Figure 4:
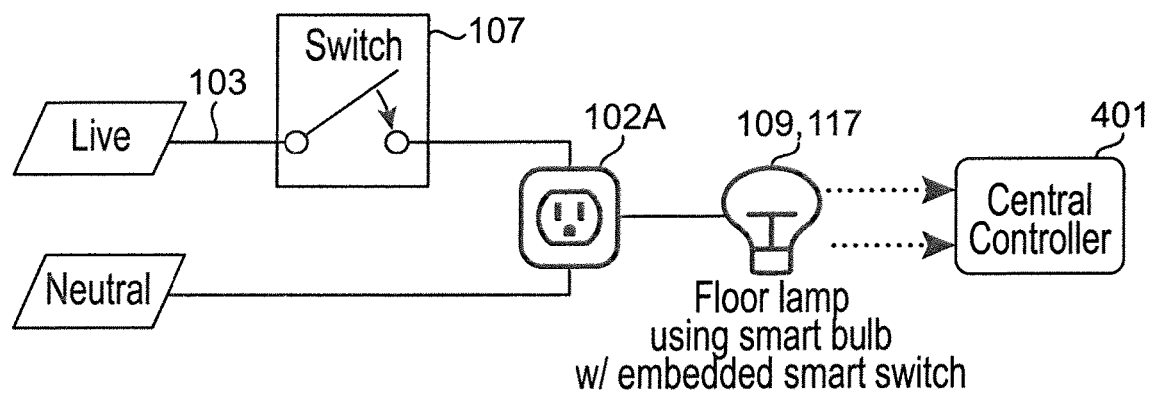
FIG. 4 depicts another an embodiment of a circuit using a smart switch with a central controller.

FIG. 4 depicts an alternative embodiment of a system using an embodiment of an apparatus (117) according to the present disclosure. In the depicted embodiment of FIG. 4, the load (109) and apparatus (117) are integrated into a single physical device (e.g., disposed within the same housing). In the depicted embodiment, this device is a floor lamp including a smart bulb (109). The floor lamp is plugged into the power receptacle (102A). In the depicted embodiment of FIG. 4, the system further comprises an external central controller (401). This configuration address a problem with smart devices whereby when a device is first supplied with power, it can operate but has not yet received any state information about the user's desired settings.

For example, when a smart bulb is first purchased and screwed into a floor lamp, and provided power, the bulb has no way of knowing what brightness level the user may desire, nor whether the user desires for the bulb to be on or off. Typically, the device will be pre-programmed by the manufacturer with a default setting, such as turning on at full-brightness. If the bulb is later provided with instructions to alter state, such as to switch to half-brightness, but the switch (107) is toggled off (cutting power), the bulb may reset to its default settings when power is restored. When the switch (107) is closed, the bulb (109) will thus re-illuminate at full brightness, even though the user had previously provided a half brightness setting.

The depicted embodiment solves this problem by integrating the apparatus (117) into a smart bulb (109), and communicating the state with a central controller (401). This configuration may be best understood with reference to a non-limiting, illustrative example. Suppose a user enters the room and turns on the light switch (107), closing the circuit. The bulb (109) then receives power, as does the apparatus (117) embedded therein. The apparatus (117), because it has power, infers the switch (107) state to be on, and transmits a signal to the central controller (401) that the associated light bulb (109) is toggled to a power state of "on." The user then subsequently alters the power state of the bulb (109) by sending instructions to the bulb to switch to half-brightness. This signal is also detectable by the apparatus (117), which then relays to the central controller (401) this updated state information.

When the switch (107) is open, and power is removed, the bulb turns off, and the secondary power source of the apparatus (117) maintains power long enough for the apparatus (117) to transmit any needed instructions or messages concerning power state, including a message to the central controller (401) that the bulb state (109) is now off. When the switch (107) is once again closed, and power is restored to the bulb (109), the apparatus (117) can query the central controller (401) for the last known settings for the associated bulb (109). The central controller (401) may respond to this message with data indicating that the bulb (109) was set to half-brightness before power was removed, and the apparatus (117) can then set the bulb (109) to that same setting. This allows settings to be retained across power states by storing them externally via the central controller (401).

The "power state" of the switch may be determined directly or indirectly, and that state may be transmitted or relayed using direct or indirect measurements. For example, a measurement of current could be taken and transmitted, where a non-zero measurement indicates "on" and a zero measurement indicates "off."

As will be clear to a person of ordinary skill in the art, the central controller (401) performs these functions by use of other component systems, such as a memory, and other circuitry and computer components necessary to receive the transmissions from the apparatus (117), and to respond to them. Thus, for example, the central controller (401) itself also comprises a transceiver, as well as other components.

This basic configuration can be expanded upon to use the central controller (401) as a central relay for instructions. That is, the central controller (401) may be a hub for additional inputs, which may be provided manually or by external data sources. For example, the central controller (401) may have access to date/time services (e.g., via a network time protocol server), and may be configured to use this information to vary the brightness upon power-up. When power is restored, and the apparatus (117) queries the central controller (401) for a power state to set the bulb (109) to, the central controller (401) may provide a power state corresponding to the time of day as determined via a network time service. For example, if the detected time is noon, the central controller may indicate that the lamp should be left off. However, if the detected time is midnight, then brightness may be set to maximum. Alternatively, the central controller (401) may maintain an archive of historical settings and use machine/earning/training to infer preferences. For example, the central controller (401) may note that at different times of day, and different times of year, the user prefers certain specific brightness settings. When the lamp is activated, the central controller (401) may consult the current time of day and of year, and return a default brightness setting consistent with prior user preferences. The example of time and day of year is exemplary only and should not be understood as limiting.

Figure 5:
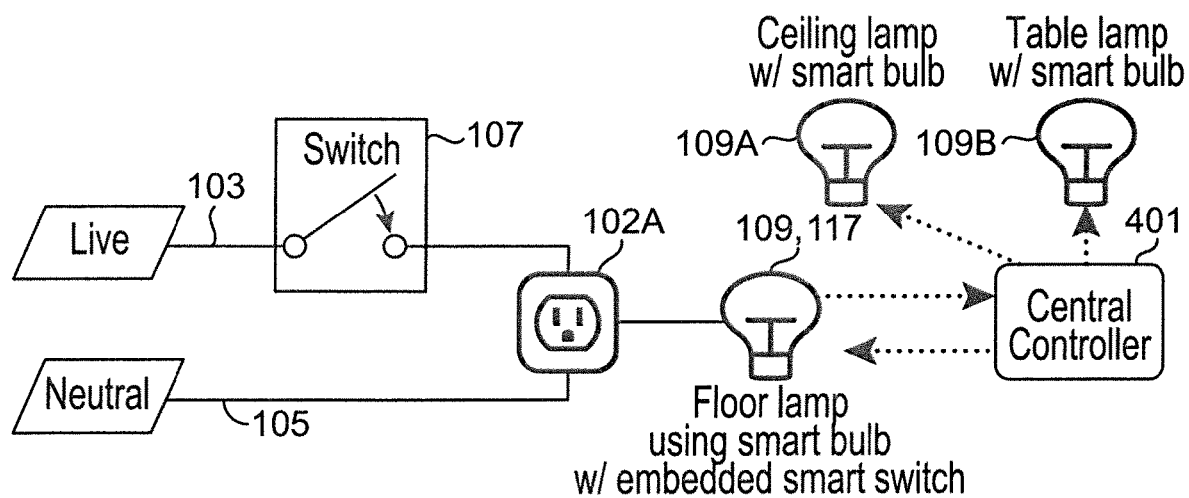
FIG. 5 depicts another an embodiment of a circuit using a smart switch with a central controller.

Additionally, other devices may be connected to the apparatus (117) via the controller (401), and controlled in the same fashion. In the depicted embodiment of FIG. 5, for example, one or more additional smart devices (109A) and (109B) may also communicate via the central controller (401), and receive instructions from same. Thus, in the above example, when the floor lamp (109) receives power, and the apparatus (117) communicates with the central controller (401), the central controller (401) may reply to the apparatus (117) not only with instructions for how to set the power state of the bulb (109), but may also supply additional power state instructions to the one or more other connected smart devices (109A) and (109B).

In an embodiment, the apparatus (117) does not have the optional secondary power source (131). Such an embodiment would still be capable of functioning when power was supplied, but will generally not function when power was removed. This would reduce the utility of the device, but would simplify construction/manufacturing and reduce cost.

A number of further interesting user interactions are possible. Described below is an illustrative example interaction implemented on smart light bulbs installed in a garage, where power is generally supplied to said smart light bulbs through a traditional 2-way electrical switch in said garage. When the switch is operated and those lights power up, an attached smart switch (117) may then send a signal to the central controller (401) indicating that power is on. Based on prior user configuration, the central controller (401) may then transmit a signal to other smart devices, such as those located throughout the attached dwelling, to reduce lighting in the home over a period of time (e.g., the next five minutes). In this way, turning on the garage lights indicates that the house has been emptied and that lights left on may be turned off in the remainder of the home. That is, this setting contains an implicit assumption that when the garage lights are turned on, the occupants are leaving. Similarly, when returning home, the user may turn off the lights in the garage before going into the house. Using these same principles, a signal could be used to turn on the lights in the rest of the home in anticipation of the occupants returning.

Because the power signal into the smart switch (117) indicates whether power was supplied to or removed from a circuit, the precise steps taken in response to a change in power signal depend upon the particular programming of the apparatus (117), and/or the central controller (401). A limitless variety of interactions and secondary effects are possible, depending upon user preferences and programming.

Figure 7:
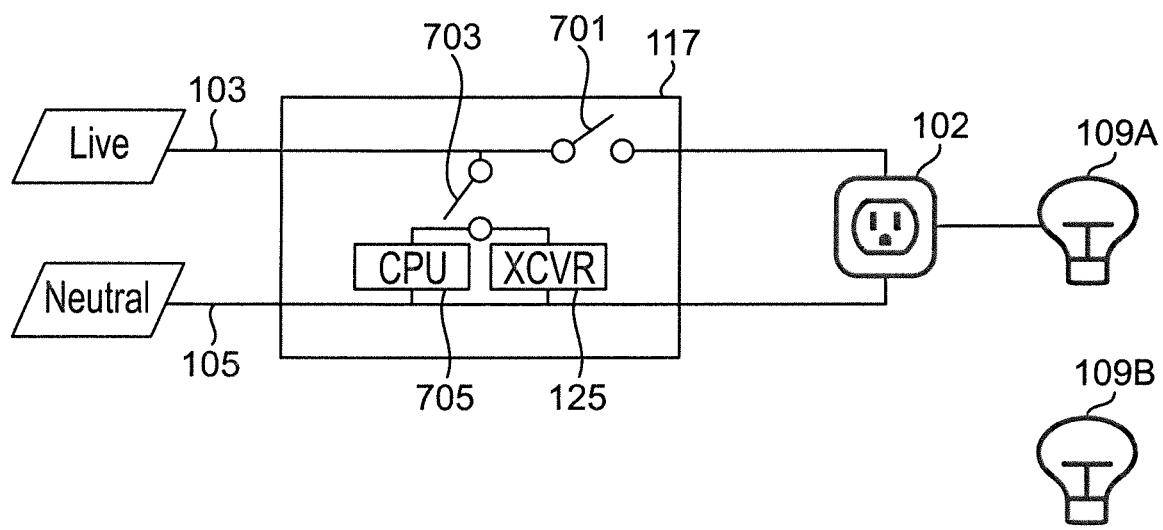
FIG. 7 depicts an alternative embodiment of a smart switch.

FIG. 7 depicts an additional embodiment in which the smart switch (117) functionality is incorporated into a conventional wall-mounted mechanical switch structure (107) in order to allow for simultaneous control, via a single wall switch, or both conventional or "dumb" lights (109A) operatively connected to the switch (107) by a circuit, and with smart lights (109B) that are not. In the depicted embodiment of FIG. 7, the switch (107) includes a first set of contacts (701) operable to close the circuit and thus provide power to an attached receptacle (102) and load (109A) plugged into same. The mechanical switch is also connected to a second set of contacts (703) operable to close a second circuit, the second circuit including the transmitter (125) and optionally other components, such as a controller (705) or processor (705), a power converter, a current sensor, secondary power supply, and associated circuitry as described elsewhere herein. The two set of contacts (701) and (703) are operatively connected to the mechanical switch such that when one is open, the other is closed, and vice versa.

Thus, when the switch is turned "off," power flows through the second circuit and powers the transceiver (125) and related components, which can then communicate the power state to the smart light (109B) or other connected smart devices to operate them in accordance with the switch (107) state. When the switch is turned back "on," the second circuit breaks and the first circuit closes, providing power to the conventional load (109A) on the first circuit. The transmitter (125) communicates the new switch (107) state to the smart light (109B) before losing power. A secondary power supply can be included to ensure sufficient time to complete the transmission, as described elsewhere herein.

In this fashion, the outlet (102) may continue to be operated as a conventional outlet (102) on which electrical power is actually cut, removing electrical current from the load (109A) and thereby reducing power consumption from phantom loads. At the same time, smart devices (109B) can also be operated by the switch (107). All of this can be done without having to run new cabling or wiring, but rather by simply replacing a conventional wall switch. In an alternative embodiment, the second set of contacts (703) may be omitted and replaced with a wire, allowing power to be continuously supplied to the transceiver (125) and other components.

The detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention. These systems and methods are appropriate for use with smart devices and internet of things ecosystems.

The invention claimed is:

1. A smart switch for operating a conventional electrical device in the same system as a smart device, the switch comprising:
   an electric power input adapted to receive electric power;
   an electric power output for providing said electric power to said conventional electrical device;
   a mechanical switch for altering a power state of said smart switch from said electric power output providing power to said conventional electrical device and said electric power output not providing power to said conventional electrical device;
   a measurement device adapted to measure said power state; and
   a wireless transceiver in electric communication with said electric power input measurement device, said wireless transceiver adapted to:
      receive from said measurement device a reading of said power state; and
      wirelessly transmit to said electric smart device information about said power state based on said reading;
   wherein when said power state changes, said electric smart device changes an internal power state to correspond to said power state of said smart switch.

2. The smart switch of claim 1, wherein said reading is made at least in part using an electric circuit characteristic.

3. The smart switch of claim 2, wherein said electric circuit characteristic is indicative of said power state based on a known mathematical relationship between said electric circuit characteristic and said power state.

4. The smart switch of claim 2, wherein said electric circuit characteristic is selected from the group consisting of: power applied; current; voltage; and, phase.

5. The smart switch of claim 1, wherein said smart switch further comprises a light-producing element.

6. The smart switch of claim 1, wherein said conventional electrical device is selected from the group consisting of: light element, dimmer control circuit, ceiling fan, and wireless range extender.

7. The smart switch of claim 1, further comprising a power converter adapted to draw power for said smart switch from said electric power input.

8. The smart switch of claim 7, further comprising an energy storage medium adapted to supply electric power to said transceiver.

9. The smart switch of claim 8, wherein said energy storage medium is selected from the group consisting of: capacitor; inductor; battery; and, rechargeable battery.

10. The smart switch of claim 1, further comprising at least one of a capacitor, a battery, or a rechargeable battery.

* * * * *